US011736002B2

(12) United States Patent
Lee et al.

(10) Patent No.: US 11,736,002 B2
(45) Date of Patent: Aug. 22, 2023

(54) ADAPTIVE SOFT START AND SOFT STOP DEVICE FOR CONVERTER

(71) Applicant: Power LSI Co. ltd, Daejeon (KR)

(72) Inventors: Won Tae Lee, Bucheon-si (KR); Won Ji Lee, Daejeon (KR); Chang Sik Shin, Chungcheongbuk-do (KR); Chuen Sik Jung, Suwon-si (KR); Gyu Won Lee, Guri-si (KR)

(73) Assignee: Power LSI Co. ltd, Daejeon (KR)

( * ) Notice: Subject to any disclaimer, the term of this patent is extended or adjusted under 35 U.S.C. 154(b) by 0 days.

(21) Appl. No.: 18/041,843

(22) PCT Filed: Jun. 28, 2021

(86) PCT No.: PCT/KR2021/008066
§ 371 (c)(1),
(2) Date: Feb. 16, 2023

(87) PCT Pub. No.: WO2022/080624
PCT Pub. Date: Apr. 21, 2022

(65) Prior Publication Data
US 2023/0231469 A1 Jul. 20, 2023

(30) Foreign Application Priority Data
Oct. 15, 2020 (KR) .................. 10-2020-0133527

(51) Int. Cl.
*H02M 3/158* (2006.01)
*H02M 1/36* (2007.01)
(Continued)

(52) U.S. Cl.
CPC ............... *H02M 1/36* (2013.01); *H02M 1/08* (2013.01); *H02M 3/157* (2013.01); *H02M 3/158* (2013.01);
(Continued)

(58) Field of Classification Search
None
See application file for complete search history.

(56) References Cited

U.S. PATENT DOCUMENTS

| 5,917,313 A | 6/1999 | Callahan, Jr. |
| 6,933,710 B2 * | 8/2005 | Shieh .................... H02M 3/155 363/91 |

(Continued)

FOREIGN PATENT DOCUMENTS

| CN | 101217252 | * 9/2010 | .............. H02M 1/36 |
| EP | 2009773 A2 | * 12/2008 | .............. H02M 1/36 |

(Continued)

*Primary Examiner* — Matthew V Nguyen
(74) *Attorney, Agent, or Firm* — NKL Law; Byungwoong Park (57) ABSTRACT

The present invention relates to an adaptive soft start and soft stop device for a converter, and more particularly, provides an adaptive soft start and soft stop device for a converter which controls a final output voltage to be increased or decreased with a predetermined gradient by increasing a duty at a predetermined rate or increases a frequency during a start period using an input voltage Vin and an output voltage Vo and decreasing the duty at a predetermined rate or decreases a frequency during a stop period.

10 Claims, 5 Drawing Sheets

(51) Int. Cl.
*H02M 1/08* (2006.01)
*H02M 3/157* (2006.01)
*H02M 1/00* (2006.01)

(52) U.S. Cl.
CPC ........ *H02M 1/0003* (2021.05); *H02M 1/0006* (2021.05)

(56) References Cited

U.S. PATENT DOCUMENTS

| | | |
|---|---|---|
| 8,350,541 B2 | 1/2013 | Ojanen et al. |
| 10,686,381 B1 | 6/2020 | Zhang et al. |
| 2010/0164579 A1* | 7/2010 | Acatrinei ............ H02M 1/4208 327/172 |
| 2017/0070149 A1* | 3/2017 | Guan ...................... H02M 1/36 |

FOREIGN PATENT DOCUMENTS

| | | |
|---|---|---|
| JP | 2018-153079 A | 9/2018 |
| KR | 10-2007-0073576 A | 7/2007 |
| KR | 10-1642761 B1 | 8/2016 |
| KR | 10-2016-0105606 A | 9/2016 |
| KR | 10-2096171 B1 | 4/2020 |
| KR | 10-2204422 B1 | 1/2021 |

* cited by examiner

ADAPTIVE SOFT START AND SOFT STOP DEVICE FOR CONVERTER

TECHNICAL FIELD

The present invention relates to an adaptive soft start and soft stop device for a converter, and more particularly, to an adaptive soft start and soft stop device for a converter capable of controlling a final output voltage to be increased or decreased with a predetermined gradient by increasing a duty at a predetermined rate or increasing a frequency during a start period and decreasing the duty at a predetermined rate or decreasing a frequency during a stop period, using an input voltage Vin and an output voltage Vo.

BACKGROUND ART

In electronic communication devices, a power supply device which supplies stable power is the most basic part of the system and as such a power supply device, a switching mode power supply device, such as a DC-DC converter, is being actively studied.

During the initial startup of a DC-DC converter, excessive inrush current may be generated so that it is necessary to apply a soft start technique to prevent the excessive inrush current.

As a general soft start technique, there are a linear charging method of supplying a limited current to an output capacitor to increase an output voltage of the DC-DC converter and a switching method of changing a duty of a pulse width modulation (PWM) signal to increase an output voltage of the DC-DC converter.

However, in this case, during a period in which a mode is switched from a soft start mode to a switching mode, a current which flows through an inductor of the DC-DC converter instantaneously and sharply increases to cause an excessive inrush current. The instantaneous inrush current as described above causes deterioration of an inductor, damage to a circuit, excessive response of an output voltage, and the like.

As a technique for solving this problem, Korean Registered Patent No. 10-1642761 discloses soft start apparatus and method for a DC-DC converter. In a linear charge mode, a current is supplied to linearly increase an output voltage of the DC-DC converter and in a switching mode, a switching operation is performed according to a duty of a pulse width modulation (PWM) signal to increase the output voltage to a target level. In the linear charge mode, it is determined to enter a switching mode and in the switching mode, a duty of the pulse width modulation (PWM) signal is controlled based on the control signal. In a period in which a mode is switched, a control signal having an initial slope is generated to induce a duty of the pulse width modulation (PWM) signal to gradually increase in response to the slope in the initial switching mode and during the switching mode, the duty of the pulse width modulation (PWM) signal is controlled with respect to a current limit value to limit the current of the DC-DC converter. By doing this, the generation of the instantaneous inrush current caused when the mode is switched to the switching mode after the linear charge mode is prevented.

However, in Korean Registered Patent No. 10-1642761, in order to implement the linear control during the mode switching, a control signal (E/A OUT) having an initial slope is generated so that the duty of the pulse width modulation (PWM) signal is induced to gradually increase in response to a slope of the control signal in the initial switching mode. That is, there is a limitation in the slope of the control signal (E/A OUT) in the period in which the mode is switched so that it is limited to quickly increase the output voltage to a target level.

In the meantime, Korean Registered Patent No. 10-2096171 discloses soft start apparatus and method for DC-DC converter.

Korean Unexamined Patent Application Publication No. 10-2016-0105606 discloses DC-DC converter, charging integrated circuit, and electronic device having the same, and battery charging method thereof.

In the meantime, according to the existing Patents, only the control for soft start is performed and after changing to an off-state of the converter, control for soft stop is not performed.

SUMMARY

Accordingly, the present invention has been made in an effort to solve the above-described problem and an object of the present invention is to provide an adaptive soft start and soft stop device for a converter which may control a final output voltage to increase or decrease with a predetermined gradient by increasing a duty at a predetermined rate or increasing a frequency during a start period and decreasing a duty at a predetermined rate or decreasing a frequency during a stop period, using an input voltage Vin and an output voltage Vo.

An object of the exemplary embodiments of the present invention is not limited to the aforementioned object, and other not-mentioned objects will be obviously understood by those skilled in the art from the description below.

In order to achieve the objects as described above, according to an aspect of the present invention, an adaptive soft start and soft stop device for a converter includes: an adaptive reference generator 100 which generates and outputs a reference voltage VREF; a TON generator 200 which receives an input voltage Vin, an output voltage Vo, and an output signal VREF of the adaptive reference generator to generate a signal whose duty increases at a predetermined rate or frequency increases during a start period and duty decreases at a predetermined rate or frequency decreases during a stop period; a pulse width modulation (PWM) controller 300 which outputs a pulse width modulation (PWM) signal using an output signal of the TON generator and an output signal of a pulse width modulation (PWM) comparator; a current RAMP 400 which receives current information of an inductor L provided at an output end to change the current information into a voltage signal; an adaptive output voltage controller 500 which generates a discharging path using an output signal of the adaptive reference generator; a differential sensing block 600 which senses, differentially amplifies, and outputs the output voltage; an error amplifier 700 which amplifies an error using an output signal of the adaptive reference generator and an output signal of the differential sensing block; the pulse width modulation (PWM) comparator 800 which receives an output signal of the error amplifier and an output signal of the current RAMP to output a comparison signal; and a gate driver 900 which receives an output signal of the pulse width modulation (PWM) controller to output a signal for driving a power MOSFET.

The adaptive reference generator 100 includes: a clock generator 101 which generates and outputs a clock signal which determines a one-step period; an up-down counter 102 which receives the clock signal to output a digital code signal SEL<8:0>; a soft start converter 103 which receives the digital code signal to output a soft start voltage (VSST); a reference voltage output unit 104 which generates and outputs an output signal VREF_OUT of a constant voltage regardless of a temperature; and a mode change detector 105 which outputs an output signal of the soft start converter or an output signal of a reference voltage output unit as the reference voltage according to a mode.

The up-down counter 102 operates as an up counter when a start signal is logic high (H, High, "1") and operates as a down counter when the start signal is logic low (L, Low, "0").

When the mode is sensed to be logic low (L, Low, "0"), the mode change detector 105 outputs the output signal of the soft start converter as the reference voltage and when the mode is sensed to be logic high (H, High, "1"), the mode change detector outputs an output signal of the reference voltage output unit as the reference voltage.

The TON generator 200 includes: an inverter 201 which receives the pulse width modulation (PWM) signal to output an inverted signal; a switch 202 which is switched according to an output signal of the inverter; a current source 203 which generates a current using the input voltage and the output voltage; a capacitor 204 provided between an output of the current source and the ground GND; and a comparator 205 having a negative terminal which is connected to an output of the current source and a positive terminal which is connected to the reference voltage VREF so that an output signal is changed according to the reference voltage VREF.

The current source satisfies the following Equation 3:

$$I = K \times (I_{VIN}/I_{VO}) \quad \text{[Equation 3]}$$

(Here, $I_{VIN}$ is an input current, $I_{VO}$ is an output current, and K is a compensation value).

In the comparator 205, when the pulse width modulation (PWM) signal is logic high (H, High, "1"), the capacitor is charged and a rising edge is generated. When the voltage charged in the capacitor is equal to the reference voltage VREF, a falling edge is generated.

The adaptive output voltage controller 500 includes: a current controller 501 which determines a size of a voltage control current source connected to the output voltage; and a voltage control current source 502 which adaptively (variably) discharges current so that the output voltage is reduced with a predetermined gradient according to a state of the load.

A current flowing in the voltage control current source 502 is expressed by the following Equation 4:

$$I_{(502)} = (Vo - VREF)/R \quad \text{[Equation 4]}$$

(Here, R is a resistor located between Vo and VREF, Vo is an output voltage, and VREF is a reference voltage).

An output end of the error amplifier includes: a first resistor Rc and a first capacitor Cc connected in series between the output end of the error amplifier and a ground GND; and a second capacitor Cz provided between the output end of the error amplifier and the ground.

The adaptive soft start and soft stop device for a converter according to the exemplary embodiment of the present invention is capable of controlling a final output voltage to be increased or decreased with a predetermined gradient by increasing a duty at a predetermined rate or increasing a frequency during a start period and decreasing the duty at a predetermined rate or decreasing a frequency during a stop period, using an input voltage Vin and an output voltage Vo.

Further, according to the adaptive soft start and soft stop device for a converter according to the exemplary embodiment of the present invention, an input voltage Vin and an output voltage Vo are used to increase a duty at a predetermined rate or increase a frequency during a start period and decrease the duty at a predetermined rate or decrease a frequency during a stop period, so that an inrush current does not occur during an initial operation of the converter.

Further, according to the adaptive soft start and soft stop device for a converter according to the exemplary embodiment of the present invention, an input voltage Vin and an output voltage Vo are used to increase a duty at a predetermined rate or increase a frequency during a start period and decrease the duty at a predetermined rate or decrease a frequency during a stop period, so that a load current is quickly and linearly discharged during an off operation of the converter.

| Description of Main Reference Numerals of Drawings | |
|---|---|
| 100: Adaptive reference generator | 200: TON generator |
| 300: Pulse width modulation (PWM) controller | 400: Current RAMP |
| 500: Adaptive output voltage controller block | 600: Differential sensing |
| 700: Error amplifier | |
| 800: Pulse width modulation (PWM) comparator | |
| 900: Gate driver | 1000: LDO |
| 101: Clock generator | 102: Up-down counter |
| 103: Soft start converter | 104: Reference voltage output unit |
| 105: Mode change detector | 201: Inverter |
| 202: Switch | 203: Current source |

-continued

Description of Main Reference Numerals of Drawings

| | |
|---|---|
| 204: Capacitor | 205: Comparator |
| 501: Current controller | 502: Voltage control current source |

DETAILED DESCRIPTION OF EMBODIMENTS

Those skilled in the art may make various modifications to the present invention and the present invention may have various embodiments thereof, and thus specific embodiments will be illustrated in the drawings and described in detail. However, this does not limit the present invention within specific exemplary embodiments, and it should be understood that the present invention covers all the modifications, equivalents, and replacements within the spirit and technical scope of the present invention.

It should be understood that, when it is described that an element is "coupled" or "connected" to another element, the element may be directly coupled or directly connected to the other element or coupled or connected to the other element through a third element.

In contrast, when it is described that an element is "directly coupled" or "directly connected" to another element, it should be understood that no element is present therebetween.

Terms used in the present specification are used only to describe specific exemplary embodiments, and are not intended to limit the present invention. A singular form may include a plural form if there is no clearly opposite meaning in the context. In the present application, it should be understood that terminology "include" or "have" indicates that a feature, a number, a process, an operation, a component, a part, or a combination thereof described in the specification is present, but does not exclude a possibility of presence or addition of one or more other features, numbers, processes, operations, components, parts, or combinations thereof, in advance.

Unless otherwise defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in the present application.

Hereinafter, the present invention will be described in detail with reference to accompanying drawings. Prior to this, terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner. The terminologies including technical terms and scientific terms used herein have the same meanings that those skilled in the art generally understand, if not defined, and the detailed description of a related known function or configuration that may make the purpose of the present invention unnecessarily ambiguous in describing the present invention will be omitted in the following description and accompanying drawings. The drawings to be introduced below are provided for sufficiently conveying the concept of the present invention to those skilled in the art. Therefore, the present invention is not limited to the following drawings, but can be specified in other forms. Further, like reference numerals designate like elements throughout the specification. In the drawings, it should be noted that the same elements will be designated by the same reference numerals although they are shown in different drawings.

Figure 1:
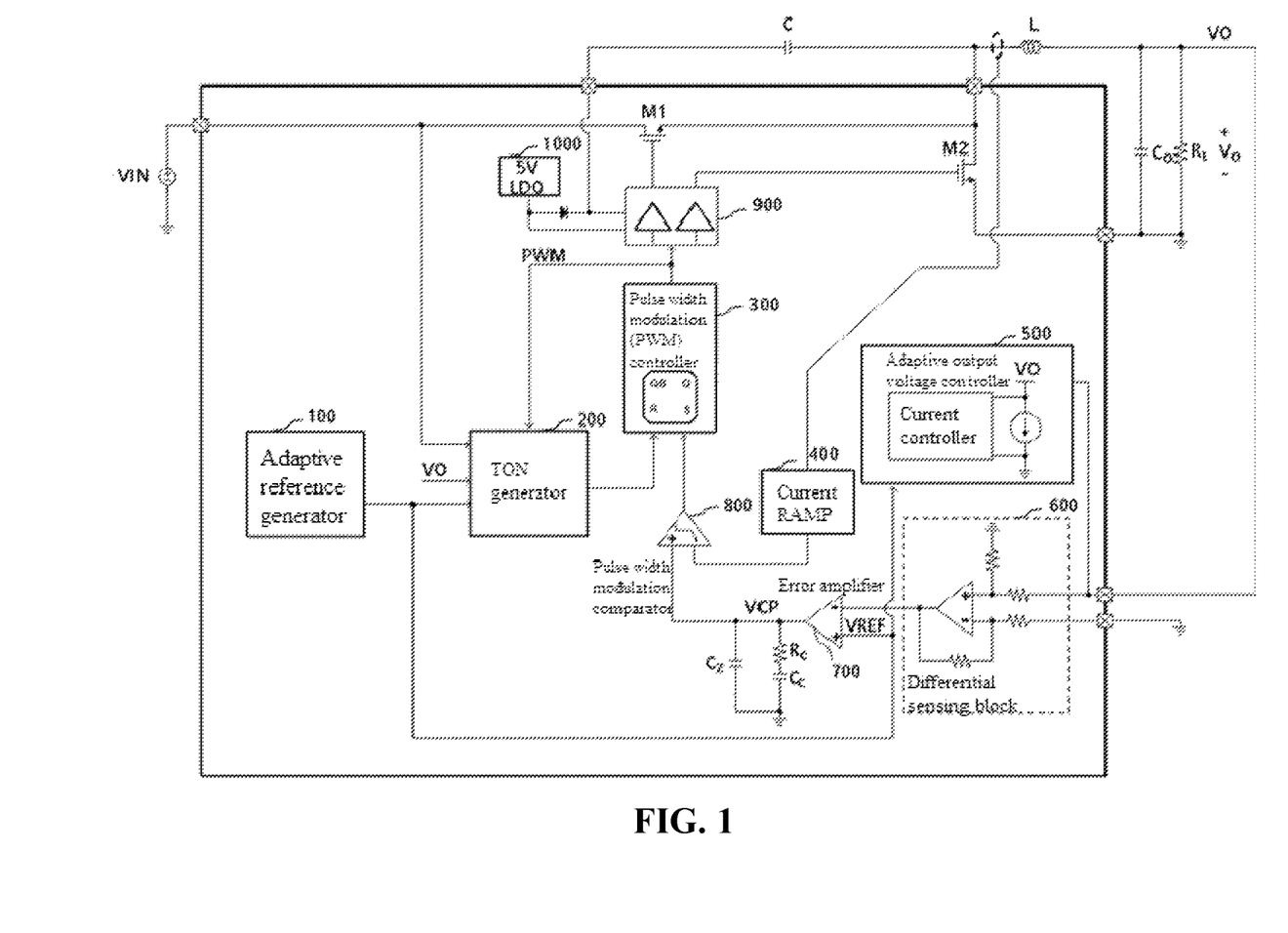
FIG. 1 is a diagram of an adaptive soft start and soft stop device for a converter according to an exemplary embodiment of the present invention.

FIG. 1 is a diagram of an adaptive soft start and soft stop device for a converter according to an exemplary embodiment of the present invention.

As illustrated in FIG. 1, an adaptive soft start and soft stop device for a converter according to an exemplary embodiment of the present invention includes an adaptive reference generator 100, a TON generator 200, a pulse width modulation (PWM) controller 300, a current RAMP 400, an adaptive output voltage controller 500, a differential sensing block 600, an error amplifier 700, a pulse width modulation (PWM) comparator 800, and a gate driver 900.

The adaptive reference generator 100 generates and outputs a reference voltage VREF according to an output voltage Vo.

The TON generator 200 receives an input voltage Vin, an output voltage Vo, and an output signal VREF of the adaptive reference generator to generate a signal whose duty increases at a predetermined rate during a start period and decreases at a predetermined rate during a stop period.

A signal output from the TON generator 200 is a signal in which a frequency increases when a duty increases at a predetermined rate, and a signal in which a frequency decreases when the duty decreases at a predetermined rate.

That is, the TON generator 200 generates a signal whose duty increases at a predetermined rate or the frequency increases during a start period and the duty decreases at a predetermined rate or the frequency decreases, using an input voltage Vin and an output voltage Vo.

The pulse width modulation (PWM) controller 300 outputs a pulse width modulation (PWM) signal using an output signal VREF of the TON generator 200 and an output signal of the pulse width modulation (PWM) comparator 800.

The current RAMP 400 receives current information of an inductor L provided at an output end to change the current information into a voltage signal and output the voltage signal.

The adaptive output voltage controller 500 generates a discharging path using an output signal VREF of the adaptive reference generator 100.

The differential sensing block 600 senses and differentially amplifies the output voltage Vo to output the voltage.

The error amplifier 700 amplifies an error using the output signal VREF of the adaptive reference generator 100 and an output signal of the differential sensing block 600.

For loop stabilization, an output end of the error amplifier 700 includes a first resistor Rc and a first capacitor Cc which are connected in series between an output end of the error amplifier 700 and a ground GND and a second capacitor Cz provided between the output end of the error amplifier 700 and the ground.

The pulse width modulation (PWM) comparator 800 receives an output signal of the error amplifier 700 and an output signal of the current RAMP 400 to output a comparison signal.

The gate driver 900 receives an output signal of the pulse width modulation (PWM) controller 300 to output a signal which drives power MOSFETs M1 and M2.

The adaptive soft start and soft stop device for a converter for supplying a power according to the exemplary embodiment of the present invention further includes a low dropout (LDO) 1000 which is a constant-voltage regulator to output a stable constant voltage to the gate driver 900.

Figure 2:
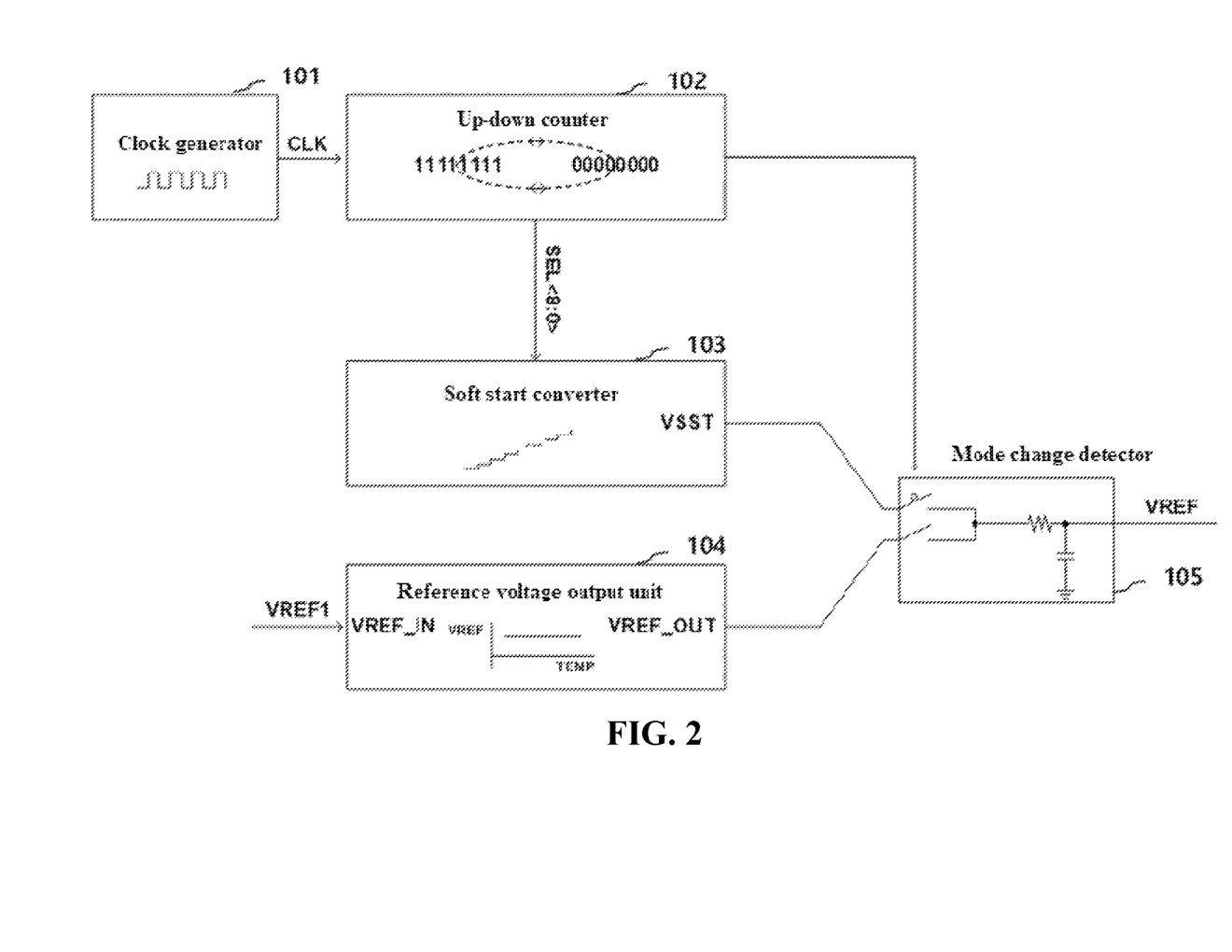
FIG. 2 is a diagram of an exemplary embodiment of an adaptive reference generator of FIG. 1.

FIG. 2 is a diagram of an exemplary embodiment of an adaptive reference generator of FIG. 1.

As illustrated in FIG. 2, the adaptive reference generator 100 includes a clock generator 101, an up-down counter 102, a soft start converter 103, a reference voltage output unit 104, and a mode change detector 105.

The clock generator 101 generates and outputs a clock signal CLK which determines one step period.

The up-down counter 102 receives the clock signal to output a digital code signal (count signal) SEL<8:0>.

The up-down counter 102 operates as an up counter when a start signal is logic high (H, High, "1") and operates as a down counter when the start signal is logic low (L, Low, "0").

The soft start converter 103 receives the digital code signal SEL<8:0> to output a soft start voltage (VSST).

The reference voltage output unit 104 generates and outputs an output signal VREF_OUT of a constant voltage for an input signal VREF_IN regardless of a temperature.

The mode change detector 105 outputs an output signal VSST of the soft start converter or the output signal VREF_OUT of the reference voltage output unit 104 as the reference voltage VREF according to the mode.

When the mode is sensed to be logic low (L, Low, "0"), the mode change detector 105 outputs the output signal VSST of the soft start converter as the reference voltage and when the mode is sensed to be logic high (H, High, "1"), outputs an output signal of the reference voltage output unit VREF_OUT as the reference voltage.

Figure 3:
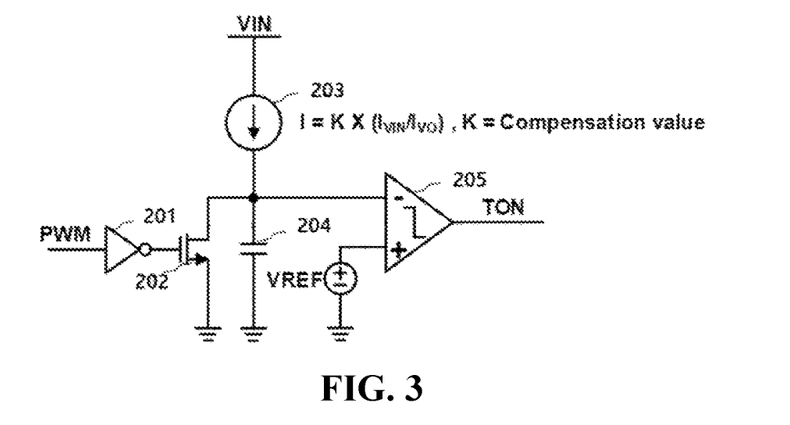
FIG. 3 is a diagram of an exemplary embodiment of a TON generator of FIG. 1.

FIG. 3 is a diagram of an exemplary embodiment of a TON generator of FIG. 1.

As illustrated in FIG. 3, the TON generator 200 of FIG. 1 includes an inverter 201, a switch 202, a current source 203, a capacitor 204, and a comparator 205.

The inverter 201 receives the pulse width modulation (PWM) signal to output an inverted signal.

The switch 202 is switched according to the output signal of the inverter 201.

The current source 203 generates a current using the input voltage Vin and the output voltage Vo.

The current source 203 satisfies the following Equation 1:

$$I = K \times (I_{VIN}/I_{VO}) \qquad \text{[Equation 1]}$$

(Here, $I_{VIN}$ is an input current, $I_{VO}$ is an output current, and K is a compensation value).

The capacitor 204 is provided between an output of the current source 203 and a ground GND.

A negative terminal of the comparator 205 is connected to an output of the current source 203 and a positive terminal is connected to the reference voltage VREF so that an output signal is changed according to the reference voltage VREF.

In the comparator 205, when the pulse width modulation (PWM) signal is logic high (H, High, "1"), the capacitor 204 is charged and a rising edge is generated.

Thereafter, when a voltage charged in the capacitor 204 is equal to the reference voltage VREF of the comparator 205, a falling edge is generated.

The TON generator 200 changes a duty in accordance with the change in the input reference voltage VREF.

Figure 4:
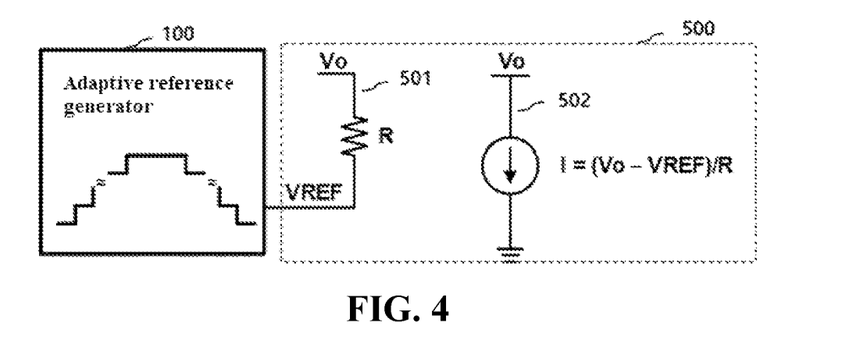
FIG. 4 is a diagram of an exemplary embodiment of an adaptive output voltage controller of FIG. 1.

FIG. 4 is a diagram of an exemplary embodiment of an adaptive output voltage controller of FIG. 1.

As illustrated in FIG. 4, the adaptive output voltage controller 500 of FIG. 1 includes a current controller 501 and a voltage control current source 502.

The current controller 501 determines a size of a voltage control current source connected to the output voltage.

The voltage control current source 502 adaptively (variably) discharges current so that the output voltage is reduced with a predetermined gradient according to a state of the load.

A current flowing in the voltage control current source 502 is expressed by the following Equation 2:

$$I_{(502)} = (Vo - VREF)/R \qquad \text{[Equation 2]}$$

(Here, R is a resistor located between Vo and VREF, Vo is an output voltage, and VREF is a reference voltage).

Figure 5:
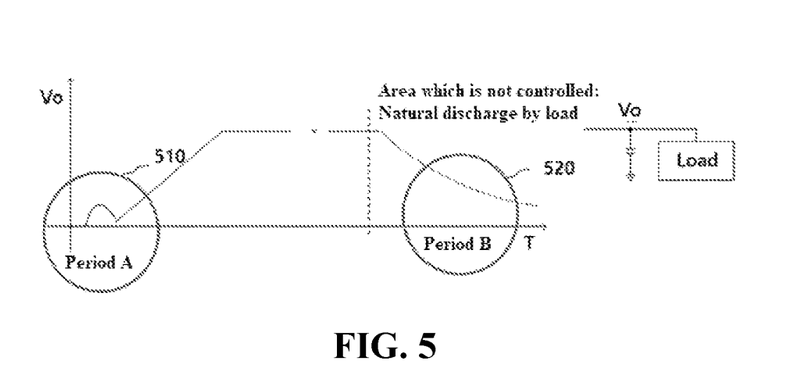
FIG. 5 is a view for explaining an output voltage of a converter of the related art.

FIG. 5 is a view for explaining an output voltage of a converter of the related art.

As illustrated in FIG. 5, when the control is performed by the existing method, Period A 510 is an initial startup section, so that an inrush current phenomenon in which an output voltage increases occurs.

Further, Period B 520 is an area which is not controlled so that when the converter is off, the voltage decrease is caused by natural discharge due to a load.

Figure 6:
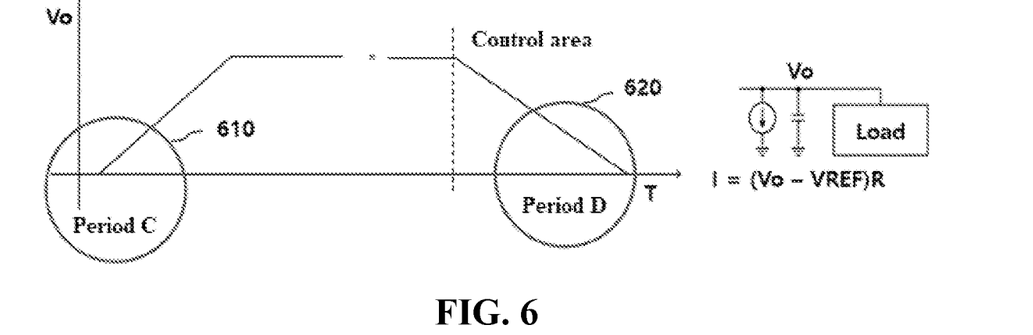
FIG. 6 is a view for explaining an output voltage of an adaptive soft start and soft stop device for a converter according to an exemplary embodiment of the present invention.

FIG. 6 is a view for explaining an output voltage of an adaptive soft start and soft stop device for a converter according to an exemplary embodiment of the present invention.

As illustrated in FIG. 5, in the adaptive soft start and soft stop device for a converter according to the present invention, Period C 610 is an initial startup period and the inrush current phenomenon does not occur and the output voltage increases with a constant gradient.

Further, Period D 620 is controlled to soft-stop so that the output voltage decreases with a constant gradient.

Figure 7:
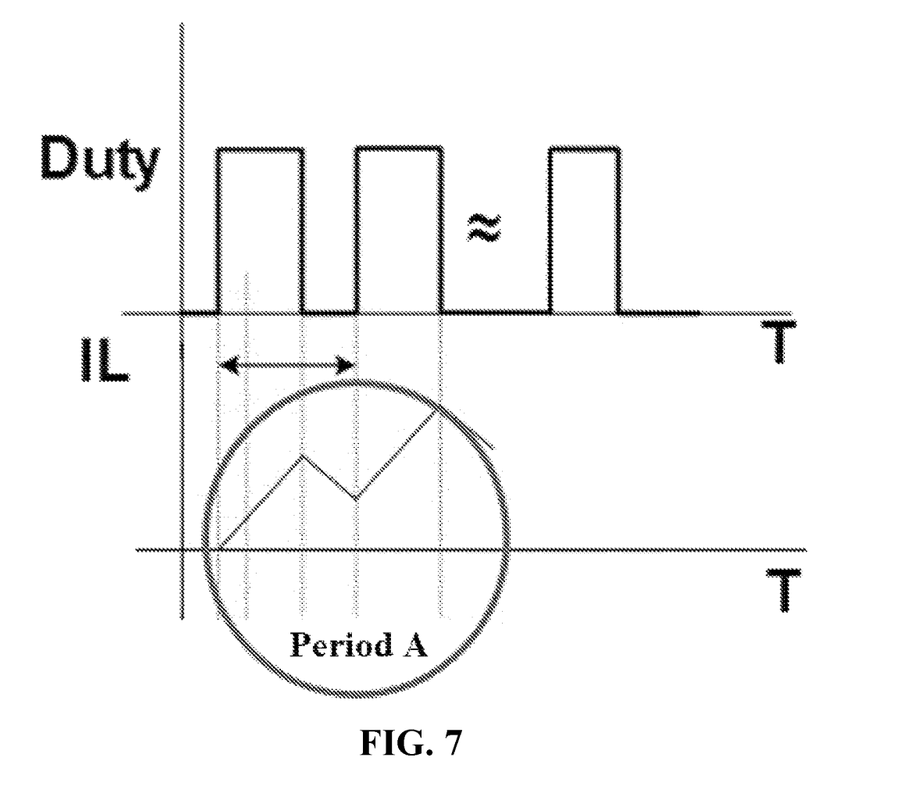
FIG. 7 is a view for explaining that a duty is not controlled in the related art.
Figure 8:
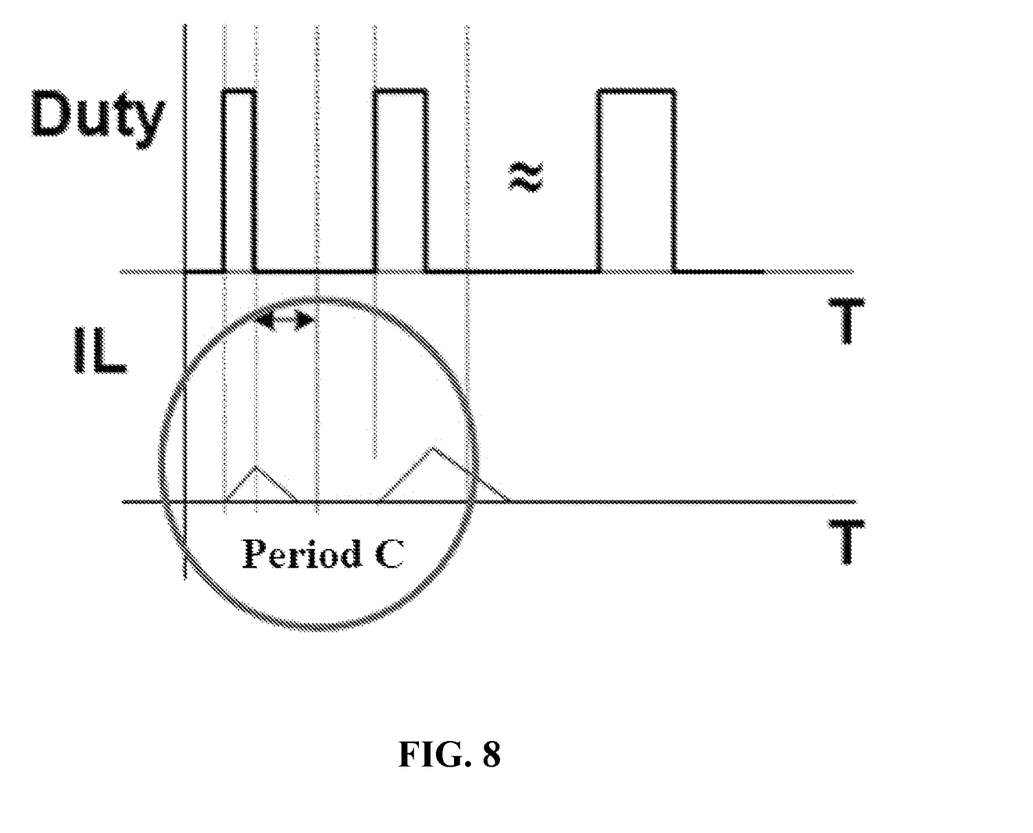
FIG. 8 is a view for explaining that a duty is controlled in an adaptive soft start and soft stop device for a converter according to an exemplary embodiment of the present invention.

FIG. 7 is a view for explaining that a duty is not controlled in the related art and FIG. 8 is a view for explaining that a duty is controlled in an adaptive soft start and soft stop device for a converter according to an exemplary embodiment of the present invention.

As illustrated in FIG. 7, as a duty signal in Period A 510 of FIG. 5, a duty signal with a predetermined width is constantly output and thus a load current IL repeatedly increases when the duty signal is logic high and decreases when the duty signal is logic low. However, a state in which the duty signal is logic low is short so that the load current is not completely discharged, but is charged again.

As illustrated in FIG. 8, in the adaptive soft start and soft stop device for a converter according to the present invention, as a duty signal in Period C 610 of FIG. 6, a duty signal with a controlled width is output and thus a load current IL repeatedly increases when the duty signal is logic high and decreases when the duty signal is logic low. However, a current charged in a state in which the duty signal is logic high is repeatedly fully discharged in a state in which the duty signal is logic low so that the output voltage may increase with a constant gradient.

The present invention is not limited to the above-described exemplary embodiment and has various applicable ranges and various modifications can be made without departing from the gist of the present invention claimed in the claims.

The invention claimed is:

1. An adaptive soft start and soft stop device for a converter, comprising:
   an adaptive reference generator which generates and outputs a reference voltage;
   a TON generator which receives an input voltage, an output voltage, and an output signal of the adaptive reference generator to generate a signal whose duty increases at a predetermined rate or frequency increases during a start period and duty decreases at a predetermined rate or frequency decreases during a stop period;
   a pulse width modulation (PWM) controller which outputs a pulse width modulation (PWM) signal using an output signal of the TON generator and an output signal of a pulse width modulation (PWM) comparator;
   a current RAMP which receives current information of an inductor provided at an output end to change the current information into a voltage signal;
   an adaptive output voltage controller which generates a discharging path using the output signal of the adaptive reference generator;
   a differential sensing block which senses, differentially amplifies, and outputs the output voltage;
   an error amplifier which amplifies an error using the output signal of the adaptive reference generator and an output signal of the differential sensing block;
   the pulse width modulation (PWM) comparator which receives an output signal of the error amplifier and an output signal of the current RAMP to output a comparison signal;
   and a gate driver which receives an output signal of the pulse width modulation (PWM) controller to output a signal for driving a power MOSFET.

2. The adaptive soft start and soft stop device for a converter according to claim 1, wherein the adaptive reference generator includes: a clock generator which generates and outputs a clock signal which determines a one-step period; an up-down counter which receives the clock signal to output a digital code signal;
   a soft start converter which receives the digital code signal to output a soft start voltage;
   a reference voltage output unit which generates and outputs an output signal of a constant voltage regardless of a temperature;
   and a mode change detector which outputs an output signal of the soft start converter or an output signal of the reference voltage output unit as the reference voltage according to a mode.

3. The adaptive soft start and soft stop device for a converter according to claim 2, wherein the up-down counter operates as an up counter when a start signal is logic high and operates as a down counter when the start signal is logic low.

4. The adaptive soft start and soft stop device for a converter according to claim 2, wherein when the mode is sensed to be logic low, the mode change detector outputs the output signal of the soft start converter as the reference voltage and when the mode is sensed to be logic high, the mode change detector outputs an output signal of the reference voltage output unit as the reference voltage.

5. The adaptive soft start and soft stop device for a converter according to claim 1, wherein the TON generator includes: an inverter which receives the pulse width modulation (PWM) signal to output an inverted signal; a switch which is switched according to an output signal of the inverter; a current source which generates a current using the input voltage and the output voltage; a capacitor provided between an output of the current source and a ground; and a comparator having a negative terminal which is connected to the output of the current source and a positive terminal which is connected to the reference voltage so that an output signal is changed according to the reference voltage.

6. The adaptive soft start and soft stop device for a converter according to claim 5, wherein the current source satisfies a following equation:

$$I=K\times(I_{VIN}/I_{VO})$$

(here, $I_{VIN}$ is an input current, $I_{VO}$ is an output current, and K is a compensation value).

7. The adaptive soft start and soft stop device for a converter according to claim 5, wherein in the comparator, when the pulse width modulation (PWM) signal is logic high, the capacitor is charged and a rising edge is generated and when the voltage charged in the capacitor is equal to the reference voltage of the comparator, a falling edge is generated.

8. The adaptive soft start and soft stop device for a converter according to claim 1, wherein the adaptive output voltage controller includes: a current controller which determines a size of a voltage control current source connected to the output voltage; and a voltage control current source which adaptively discharges current so that the output voltage is reduced with a predetermined gradient according to a state of a load.

9. The adaptive soft start and soft stop device for a converter according to claim 8, wherein a current flowing in the voltage control current source is expressed by a following equation:

$$I=(Vo-VREF)/R$$

(here, R is a resistor located between Vo and VREF, Vo is an output voltage, and VREF is a reference voltage).

10. The adaptive soft start and soft stop device for a converter according to claim 1, wherein an output end of the error amplifier includes: a first resistor and a first capacitor connected in series between the output end of the error amplifier and a ground; and a second capacitor provided between the output end of the error amplifier and the ground.

* * * * *